United States Patent [19]
Bittner

[11] Patent Number: 5,964,136
[45] Date of Patent: Oct. 12, 1999

[54] APPARATUS FOR TRIMMING SHEETS AND STRIPS

[75] Inventor: Gerhard Bittner, Duisburg, Germany

[73] Assignee: Mannesmann Aktiengesellschaft, Dusseldorf, Germany

[21] Appl. No.: 08/804,938

[22] Filed: Feb. 24, 1997

[30] Foreign Application Priority Data

Feb. 28, 1996 [DE] Germany .......................... 196 09 256

[51] Int. Cl.⁶ ................................................. B23D 19/04
[52] U.S. Cl. ................................ 83/498; 83/482; 83/483; 83/477; 83/503
[58] Field of Search ............................ 83/498, 503, 482, 83/481, 477, 483, 479

[56] References Cited

U.S. PATENT DOCUMENTS

| Re. 27,918 | 2/1974 | Montguire ................................. 83/479 |
| 3,080,783 | 3/1963 | Knepshield ............................... 83/503 |
| 3,426,634 | 2/1969 | Richel . |
| 3,478,654 | 11/1969 | Willard ..................................... 83/479 |
| 3,503,293 | 3/1970 | Sander ...................................... 83/481 |
| 3,831,929 | 8/1974 | Hellmer .................................... 83/479 |
| 4,212,218 | 7/1980 | Braner et al. ............................. 83/479 |
| 4,327,620 | 5/1982 | Greinke et al. .......................... 83/479 |
| 4,515,052 | 5/1985 | Flaum ....................................... 83/479 |
| 4,563,930 | 1/1986 | Schommler et al. ..................... 83/481 |
| 4,922,779 | 5/1990 | Fritz et al. ................................ 83/503 |
| 5,669,279 | 9/1997 | Sohl et al. ................................ 83/498 |

FOREIGN PATENT DOCUMENTS

| 37 41 219 | 6/1989 | Germany . |
| 61-23 08 09 | 10/1986 | Japan . |

*Primary Examiner*—M. Rachuba
*Assistant Examiner*—Sean Pryor
*Attorney, Agent, or Firm*—Cohen, Pontani, Lieberman & Pavane

[57] ABSTRACT

A trimming shears for sheets and strips having two shears frames arranged opposite one another and on supports and being rotatable about a central vertical axis. A pair of vertically stacked adjustable roll blades are mounted in each shears frame at diagonally opposite horizontal corners of the shears frames. The roll blade pairs are rotary driven by gears and couplings to cut the sheet or strip edges. The roll blade pairs are adjustable both vertically and horizontally to accommodate different material thicknesses and widths. The roll blade pairs are arranged in the shears frames such that when the shears frames rotate 180° about the central vertical axis, the position of the roll blade pairs is transposed—with the first roll blade pair taking the position of the second roll blade pair.

4 Claims, 1 Drawing Sheet

APPARATUS FOR TRIMMING SHEETS AND STRIPS

BACKGROUND OF THE INVENTION

1. Field of the Invention

The present invention relates to trimming shears for sheets and strips, and more particularly to trimming shears having two shears frames arranged opposite one another on supports and having a pair of roll blades disposed on diagonally opposite corners of the shears frames.

2. Description of the Related Art

Trimming shears are used to cut sheets and strips of materials having various thicknesses and widths. For example, German Patent No. 41 08 717 C2 discloses trimming shears for cutting a strip or sheet edge with radially and axially staggered interacting roll blades. However, when trimming thin strips or strips of relatively soft material, these trimming shears generate sufficient shear force to: 1) create ripples in the material; 2) cause the edges of the material to bend; and 3) produce other miscellaneous defects. Suitable countermeasures such as, for example, simultaneously driving both of the blades, can reduce such defects. Here, the blades are simultaneously driven by a cogged roll gear mechanism, which is located either in or behind the shears frame and is connected to blade shafts by articulated shafts.

Most trimming shears have two shears frames, each of which carries the roll blades in a float-mounted fashion, i.e. the shears frames can be adjusted on a substantially horizontal plane parallel to the surface of the strip material and at a right angle to the strip cutting direction to set the width of the material being cut. In addition, the roll blades of each roll blade pair can be moved toward and away from one another, in order to allow the pair to be adjusted to different sheet thicknesses. However, the roll blades on trimming shears of this type cannot be changed without taking the machine out of service.

There is accordingly a need for a trimming shears apparatus that is adjustable to a variety of sheet widths and thicknesses and on which the blades may be removed and replaced without having to take the machine out of service.

SUMMARY OF THE INVENTION

It is accordingly an object of the present invention is to provide a trimming shears having a two pair of roll blades which are adjustable to cut a variety of material widths and thicknesses and which can be changed simply, quickly and without disabling the trimming shears.

The trimming shears of the present invention comprises two substantially vertically oriented shears frames each having a peripheral edge. The shears frames are disposed such that the rear peripheral surface of their respective peripheral edges abuttingly contact each other. The shears frames are mounted on supports for rotation about a generally central vertical axis. Four roll blades, arranged as two vertically stacked roll blade pairs, are provided in the shears frames, i.e one roll blade pair in each shears frame. The roll blade pairs are disposed at diagonally opposite horizontal ends of the shears frames with the roll blades positioned generally outside and on opposite sides of the shears frames.

The two-sided rotatable configuration of the trimming shears of the present invention provides a trimming device capable of separate and distinct operation of the oppositely disposed shears frames and roll blade pairs. For example, one shears frame may be positioned for cutting a sheet or strip of material, i.e. in a cutting position, while the other shears frame, disposed opposite thereto, is positioned for repair or replacement of its roll blades, i.e. in a non-cutting position. When the shears frames are rotated 180° about the central vertical axis, the relative position of the roll blade pairs is transposed, with one roll blade pair assuming the position of the other roll blade pair. When rotated, thusly, one roll blade pair assumes a cutting position while the other roll blade pair assumes a non-cutting position. Accordingly, only the roll blade pair in the cutting position is operable for cutting the material, while the roll blades of the roll blade pair in the non-cutting position may be replaced or repaired as needed but without having to remove the trimming shears from service.

A substantially planar material such as, for example, sheet metal, is fed horizontally between the two blades of the roll blade pair in the cutting position. The material passes through the trimming shears from side-to-side thereby defining a substantially horizontal cutting plane.

Primary drive of the roll blade pairs is provided by a substantially horizontally disposed longitudinal drive shaft. Intermediate drive of the roll blade pairs is provided by an in-line drive shaft which is coaxial with the central vertical axis and by intermediate drive shafts which are disposed on the same vertical plane as and longitudinally parallel to the in-line drive shaft. Therefore, both the in-line and intermediate drive shafts are at a right angle to the longitudinal drive shaft and substantially vertically oriented. Final drive of each of the roll blades is provided by a blade drive shaft which is parallel to the longitudinal drive shaft.

A plurality of interlockingly engaged gears and couplings transfer the rotational movement of the longitudinal, in-line, intermediate and blade drive shafts to rotational movement of the roll blades.

Since the shears frames are rotatable about the in-line drive shaft, and due in part to the parallel orientation of the axes of some of the roll blade pairs gears and coupling mechanisms, the gears and couplings need not be detached from the drive elements when the shears frames are rotated because the shears frames practically rotate about the in-line drive shaft. In other words, the shears frames rotate about the same axis as the intermediate gears and couplings.

At least one of the roll blades of each roll blade pair is adjustably mounted in each of the shears frames for selective vertical movement of the roll blade—the adjustment being substantially perpendicular to the cutting plane. The couplings and in-line drive shaft for this roll blade are correspondingly selectively adjustable. The linked adjustment of the roll blade to its coupling mechanisms and to the in-line drive shaft makes it possible to vertically adjust the roll blade without disengaging the associated couplings from the in-line drive shaft. Accordingly, engagement between the in-line drive shaft and roll blade coupling mechanisms is maintained during vertical adjustment of the roll blade. As a result, no drive elements are detached during selective adjustment of the roll blade. This selective adjustment allows a variety of sheet thickness to be cut by a single trimming shears apparatus.

The roll blade pairs are also adjustably mounted in the shears frames for selective horizontal movement, i.e. substantially parallel to the cutting plane. The couplings associated with providing final drive to the roll blades move along with the roll blades as they are selectively adjusted. Again, the linked adjustment of the roll blades to their coupling mechanisms makes it possible to horizontally adjust the roll blades without disengaging the associated couplings from the drive shafts. Accordingly, engagement between the couplings and drive shafts is maintained during horizontal adjustment of the roll blades. This selective adjustment allows a variety of sheet widths to be cut by a single trimming shears apparatus.

Each shears frame is supported on a rotary ring that coaxially encompasses the vertical rotational axis. Such a rotary ring can be designed, for example, as a ball-bearing turning rim, in order to absorb the weight of the shears frame safely and without vibrations.

In addition, the roll blade pairs of each shears frame can be disconnected from the drive mechanisms in alternating fashion, so that the roll blade pair located in the non-cutting position is disconnected from the drive mechanisms while the roll blade pair in the cutting position continues to be connected to the drive mechanisms. This allows the roll blades of the roll blade pair in the non-cutting position to be serviced or removed without shutting down the trimming shears.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
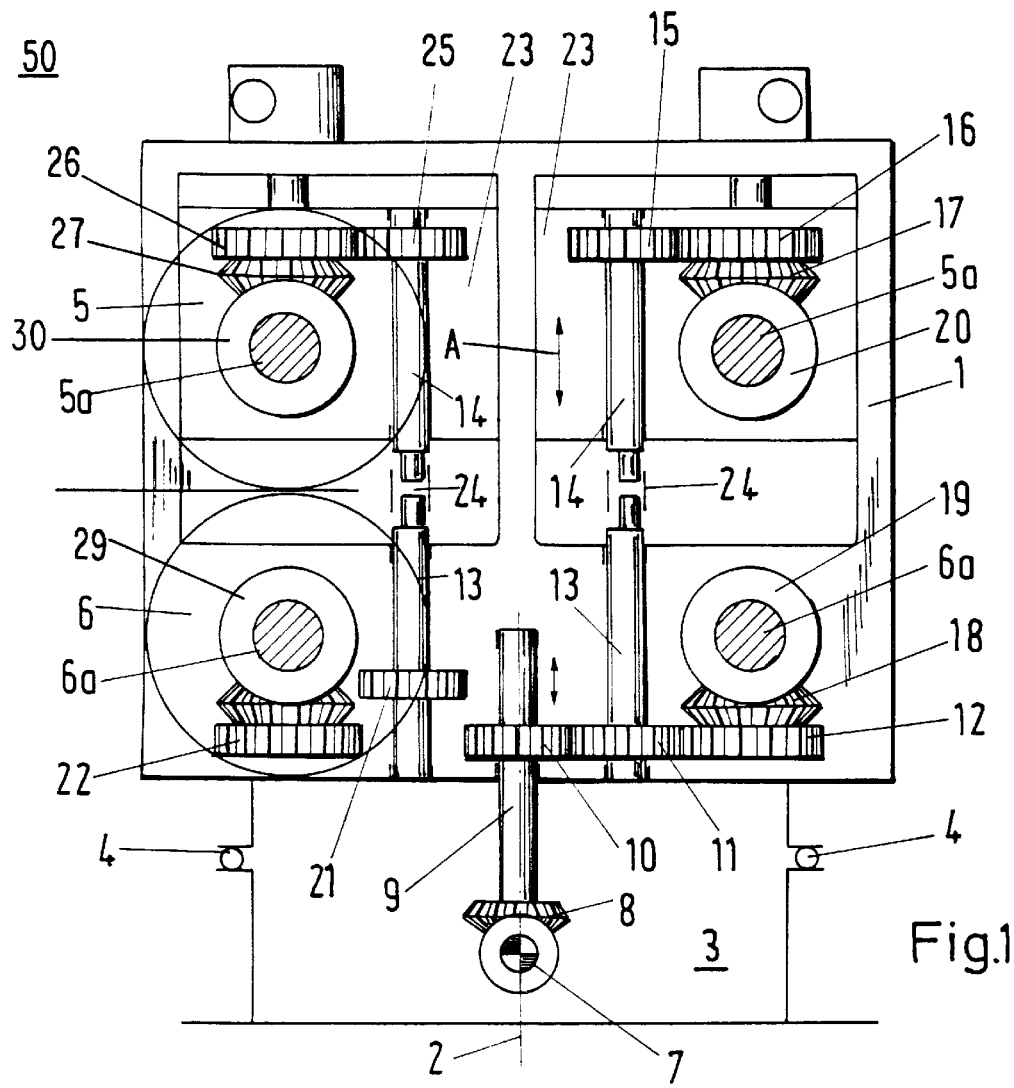
FIG. 1 is a cross-sectional front view through a trimming shears configured according to the present invention illustrating a roll blade pair in the cutting position and a roll blade pair in the non-cutting position.

Referring now to the drawings, FIG. 1 shows the trimming shears of the present invention, generally designated at 50. The trimming shears 50 comprises two substantially vertically oriented shears frames 1 (a single shears frame 1 is visible in FIG. 1) for holding the cutting and drive mechanisms of the trimming shears 50 of the present invention. The shears frames 1 each have a peripheral edge having a back surface (not shown) and are oriented directly opposite each other with the respective peripheral back edges contacting each other. The shears frames 1 are rotatably mounted on a support 3 for 360° rotation about a vertical axis 2 central to the shears frames 1. Rotation is aided by a rotary ring 4, which coaxially encompasses the central vertical axis 2. In a preferred embodiment, the rotary ring 4 is configured as a ballbearing turning rim (not shown).

A substantially planar material such as, for example, sheet metal, is fed horizontally through the trimming shears 50 from side-to-side thereby defining a substantially horizontal cutting plane (not shown).

The two-sided rotatable configuration of the trimming shears 50 of the present invention provides a trimming device capable of separate and distinct operation of the oppositely disposed shears frames 1 and the cutting and drive components mounted therein. For example, one shears frame 1 may be positioned for cutting a sheet or strip of material, i.e. in a cutting position, while the other shears frame 1, disposed opposite thereto, is positioned for repair or replacement of its component parts, i.e. in a non-cutting position.

A roll blade pair 55 is mounted in each of the shears frames 1 in a vertically stacked manner and comprises an upper roll blade 5 and a lower roll blade 6. The roll blade pairs 55 are disposed at diagonally opposite ends of the shears frames 1 and are positioned generally outside and on opposites sides of the shears frames 1. Due to the rotatability of the shears frames 1 and the diagonally opposite disposition of the roll blade pairs 55, the position of the roll blade pairs 55 is transposed when the shears frames are rotated 180° about the central vertical axis 2, with one roll blade pair 55 occupying the position of the other roll blade pair 55. Accordingly, one roll blade pair 55 will assume a cutting position (illustrated on the right side of FIG. 1), while the other roll blade pair 55 will rest in a non-cutting position (illustrated on the left side of FIG. 1). Consequently, the roll blade pairs 55 are not simultaneously operable for cutting a sheet or strip since only one roll blade pair 55 will be in the cutting position at a time while the other roll blade pair 55 is in the non-cutting position.

In a preferred embodiment, the upper roll blade 5 of each of the roll blade pairs 55 will be mounted in an insert 23 provided in each of the shears frames 1. The insert 23 allows the upper roll blade 5 to be selectively adjusted in a substantially vertical direction and perpendicular to the cutting plane. This permits selective adjustment of the cutting depth of the roll blade pair 55 to accommodate sheets or strips of different thicknesses. Adjustment of the inserts 23 and upper roll blades 5 as just described is accomplished via suitable drive means (not shown).

Both the upper and lower roll blades 5, 6 of each of the roll blade pairs 55 may also be selectively adjusted in a substantially horizontal direction and parallel to the cutting plane. This permits selective adjustment of the cutting width of the roll blade pairs 55 to accommodate sheets or strips of different widths. Adjustment of the roll blade pairs 55 as just described is accomplished via suitable drive means (not shown).

Accordingly, the roll blade pairs 55 may be selectively adjusted in both the vertical and horizontal direction, providing a trimming shears 50 capable of cutting sheets or strips having a variety of dimensional characteristics.

The roll blade pairs 55 are rotatably driven by a series of drive shafts and coupling gears mounted within the shears frames 1. The drive and coupling devices for the roll blade pairs 55 can be generally categorized as primary, intermediate and final drive and coupling devices.

Primary drive is provided by a substantially horizontally oriented longitudinal shaft 7 which runs at a right angle to the central vertical axis 2. A substantially vertical in-line drive shaft 9 is coaxial with the central vertical axis 2 of the shears frames 1 and is directly coupled at a right angle to the longitudinal drive shaft 7 via a first bevel gear 8. Rotation of the longitudinal drive shaft 7 is thereby transferred to rotation of the in-line drive shaft 9. The inline drive shaft 9 also includes a first spur gear 10 mounted thereon and spaced vertically apart from the first bevel gear 8.

Intermediate drive is provided by a plurality of gears and drive shafts contained with the shears frames 1. A lower intermediate drive shaft 13 is provided for each of the two roll blade pairs 55 which is substantially parallel to and disposed on the same vertical plane as the in-line drive shaft 9. Each of the lower intermediate drive shafts 13 have a second spur gear 11, 21 mounted thereon. The second spur gear 11, 21 rotatably engages the first spur gear 10 when a roll blade pair 55 is in the cutting position, as shown on the right side of FIG. 1. Alternatively, when a roll blade pair 55 is in the non-cutting position, the second spur gear 11, 21 is disengaged from the first spur gear 10. A third spur gear 12, 22 is provided for each of the roll blade pairs 55 and is disposed horizontally adjacent the second spur gear 11, 21 for engagement therewith. For the roll blade pair 55 arranged in the cutting position, and as illustrated on the right side of FIG. 1, the first spur gear 10, second spur gear 11 and third spur gear 12 rotatably and interlockingly engage and rest on substantially the same horizontal plane.

Abuttingly and vertically adjacent the third spur gear 12, 22 is a third bevel gear 18, 28 which rotates coincident with the third spur gear 12, 22.

The intermediate drive and coupling devices further comprise an upper intermediate drive shaft 14 for each of the two roll blade pairs 55 which is substantially parallel to and coaxial with the lower intermediate drive shaft 13. The upper and lower intermediate drive shafts 14, 13 are coupled together by a flexible coupling piece 24. A fourth spur gear 15, 25 is fixedly mounted to each of the upper intermediate drive shafts 14 for rotation therewith. A fifth spur gear 16, 26 is disposed on substantially the same horizontal plane as and adjacent the fourth spur gear 15, 25 for rotating engagement therewith.

Abuttingly and vertically adjacent the fifth spur gear 16, 26 is a second bevel gear 17, 27 which rotates coincident with the fifth spur gear 16, 26.

As final drive and coupling devices, each upper and lower roll blade 5, 6 includes a respective upper and lower roll blade drive shaft 5a, 6a having a substantially horizontal central axis about which the roll blades 5, 6 rotate. The roll blade drive shafts 5a, 6a extend from the center of the roll blades 5, 6 and pass through the two shears frames 1 such that the roll blades 5, 6 mounted thereto are disposed outside of the area defined by the shears frames 1 and on opposite sides thereof. Fixedly mounted to each of the upper and lower roll blades drive shafts 5a, 6a for rotation therewith are a fourth and fifth bevel gears 19, 29 and 20, 30, respectively, which are longitudinally moveable along the roll blades drive shafts 5a, 6a. The second bevel gear 17, 27 interlockingly engages the fifth bevel gear 20, 30 thereby providing the final coupling between the longitudinal drive shaft 7 and upper roll blades 5. The third bevel gear 18, 28 interlockingly engages the fourth bevel gear 19, 29, thereby providing the final coupling between the longitudinal drive shaft 7 and lower roll blades 6.

As an example, and as shown on the right side of FIG. 1, the lower blade 6 of a roll blade pair 55 placed in the cutting position will rotate in either a clockwise or counterclockwise direction as a result of the coupled engagement among the longitudinal drive shaft 7, first bevel gear 8, in-line drive shaft 9, first spur gear 10, second spur gear 11, third spur gear 12, third bevel gear 18, fourth bevel gear 19, lower roll blade drive shaft 6a, and lower roll blade 6. When configured thusly, the upper roll blade 5 will rotate in the same direction as the lower roll blade 6 as a result of the coupled engagement among the longitudinal drive shaft 7, first bevel gear 8, in-line drive shaft 9, first spur gear 10, lower intermediate drive shaft 13, coupling piece 24, upper intermediate drive shaft 14, fourth spur gear 15, fifth spur gear 16, second bevel gear 17, fifth bevel gear 20, upper roll blade drive shaft 5a and upper roll blade 5.

When the shears frames 1 are rotated 180°, thereby moving the other roll blade pair 55 into the cutting position, second spur gear 21, third spur gear 22, third bevel gear 28 and fourth bevel gear 29 comprise a portion of the coupling mechanisms transferring rotation of the longitudinal drive shaft 7 to rotation of the lower roll blade 6. The upper roll blade 5 rotates in response to the rotation of the longitudinal drive shaft 7 and as a result of the coupling among the lower and upper intermediate drive shafts 13, 14, fourth spur gear 25, fifth spur gear 26, second bevel gear 27 and fifth bevel gear 30.

The flexible coupling pieces 24 linking the upper and lower intermediate drive shafts 13, 14 facilitate the selective vertical adjustment of the upper roll blade 5 in the direction arrow A on the insert 23 by allowing the upper intermediate drive shaft 14 to be vertically displaced without disengagement of the associated drive shafts and coupling devices.

Second spur gear 11 or 21 disengages from first spur gear 10 when the roll blade pair 55 associated with second spur gear 11 or 21 is in the non-cutting position. As illustrated on the left side of FIG. 1, second spur gear 21 is disengaged from first spur gear 10 thereby disabling the corresponding roll blade pair 55.

Figure 2:
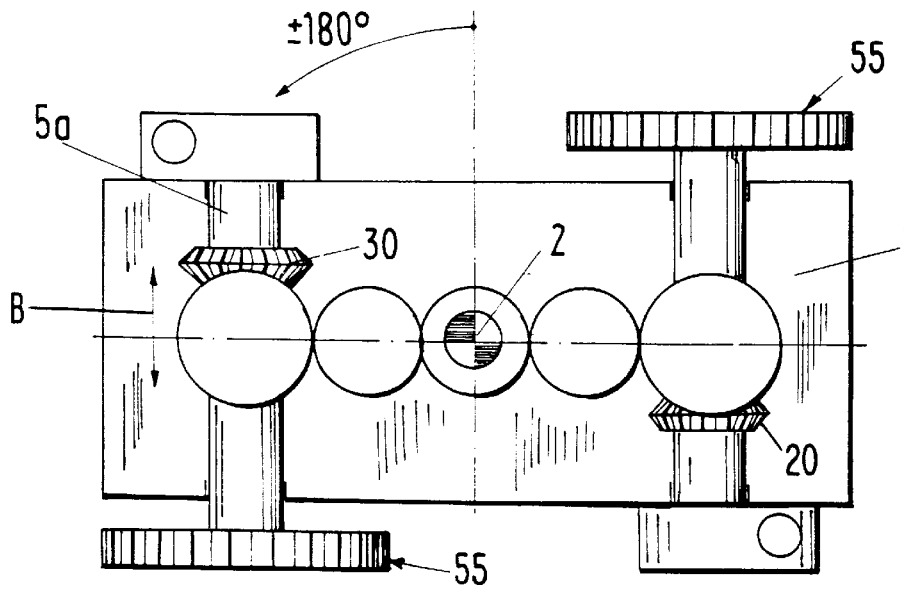
FIG. 2 is a cross-sectional bottom view of the trimming shears of FIG. 1, rotated by 90°.

Referring now to FIG. 2, a top view of the present invention shows that the roll blade pairs 55 are arranged in a rotationally-symmetric manner relative to the central vertical axis 2 of the shears frame 1. Furthermore, all of the drive gears and couplings are present practically in mirror fashion. As a result, rotating the shears frames 1 around the central vertical axis 2 by 180° will transpose the position of the roll blade pairs 55. When positioned thusly, the roll blades 5, 6 of the roll blade pair 55 in the non-cutting position (the lower left corner of FIG. 2) can be removed. As this is done, the second spur gear 11 or 21 is disconnected from the first spur gear 10 with which it is paired, depending on which roll blade pair 55 is in the non-cutting position.

The roll blades 5, 6 are also selectively adjustable in a substantially horizontal direction and parallel to the cutting plane, by moving the roll blades drive shafts 5a, 6a in the direction of the arrow B. As this is done, the second and third bevel gears 17, 27 and 18, 28 remain engaged with the fourth and fifth bevel gears 19, 29 and 20, 30, respectively. This is possible because the fourth and fifth bevel gears 19, 29 and 20, 30, which are located on the roll blades drive shafts 5a, 6a, are moveably mounted on the drive shafts 5a, 6a in a manner well known in the art. Therefore, adjustment of the roll blade pairs 55 to accommodate various sheet or strip widths is accomplished without disengaging the coupling and drive devices.

The invention is not limited by the embodiments described above which are presented as examples only but can be modified in various ways within the scope of protection defined by the appended patent claims.

What is claimed is:

1. An apparatus for trimming sheet material of a variety of widths and thicknesses comprising:
   two shears frames arranged opposite one another and having a central vertical axis defined therethrough, said two shears frames being rotatable about said central vertical axis;
   two supports upon which said two shears frames are mounted;
   a first roll blade pair comprising a rotatable upper roll blade and a rotatable lower roll blade, said first roll blade pair being selectively adjustable to accommodate different sheet thicknesses and widths;
   a second roll blade pair comprising a rotatable upper roll blade and a rotatable lower roll blade, said second roll blade pair being selectively adjustable to accommodate different sheet thicknesses and widths, one of said first and said second roll blade pairs being disposed in each of said two shears frames; and gear means for rotating said first and second roll blade pairs, said gear means interlockingly engaging said first and second roll blade pairs for rotation thereof said gear means further including an in-line vertical drive shaft which is substantially coaxial with said central vertical axis;

wherein said first and second roll blade pairs are arranged in said shears frames such that when said shears frames are rotated about said central vertical axis by approximately 180°, a position of said first roll blade pair is transposed with a position of said second roll blade pair, at least one of said roll blades in each of said first and said second roll blade pairs being selectively adjustable in a substantially vertical direction, said gear means being movable along with said at least one of said roll blades such that said interlocking engagement is maintained throughout said adjustment.

2. The trimming apparatus as defined in claim 1, wherein said upper roll blade and said lower roll blade in each of said first and said second roll blade pairs is selectively adjustable in a substantially horizontal direction, said gear means being movable along with said upper and said lower roll blades such that said interlocking engagement is maintained throughout said adjustment.

3. The trimming apparatus as defined in claim 1, further comprising:

rotary ring arranged on each of the supports so as to coaxially surround said central vertical axis and so as to support a respective one of said shears frames.

4. The trimming apparatus as defined in claim 1, wherein said first and said second roll blade pairs are alternatingly disengageable from said gear means.

* * * * *